United States Patent
Kane, II et al.

(10) Patent No.: US 10,088,304 B2
(45) Date of Patent: Oct. 2, 2018

(54) COMPOSITE CARRIER AND AUTOMATED THICKNESS MEASUREMENT AND CALIBRATION SYSTEM AND METHOD

(71) Applicant: Ocean Industries, LLC, Hudson, NH (US)

(72) Inventors: John A. Kane, II, Hudson, NH (US); John A. Kane, III, Hudson, NH (US)

(73) Assignee: OCEAN INDUSTRIES, LLC, Hudson, NH (US)

( * ) Notice: Subject to any disclaimer, the term of this patent is extended or adjusted under 35 U.S.C. 154(b) by 152 days.

(21) Appl. No.: 15/015,873

(22) Filed: Feb. 4, 2016

(65) Prior Publication Data

US 2016/0238383 A1    Aug. 18, 2016

Related U.S. Application Data

(60) Provisional application No. 62/115,401, filed on Feb. 12, 2015.

(51) Int. Cl.
| | |
|---|---|
| *G01B 15/02* | (2006.01) |
| *G01B 21/08* | (2006.01) |
| *G05B 19/401* | (2006.01) |

(52) U.S. Cl.
CPC .......... *G01B 21/08* (2013.01); *G05B 19/401* (2013.01); *G05B 2219/34242* (2013.01)

(58) Field of Classification Search
CPC ............................ G01B 21/08; G05B 19/401
See application file for complete search history.

(56) References Cited

U.S. PATENT DOCUMENTS

| | | | | |
|---|---|---|---|---|
| 6,493,956 | B1 * | 12/2002 | Matsuda | G01B 21/042 33/502 |
| 6,493,957 | B1 * | 12/2002 | Takatsuji | G01B 1/00 33/502 |
| 6,538,459 | B1 * | 3/2003 | Sticha | G01B 7/087 324/663 |
| 2013/0017762 | A1 * | 1/2013 | Thaldorf | B24B 37/005 451/5 |
| 2014/0367266 | A1 * | 12/2014 | Budiarto | G01B 7/105 205/84 |
| 2015/0273650 | A1 * | 10/2015 | Namiki | B24B 37/015 451/5 |

* cited by examiner

*Primary Examiner* — Vincent Tran
(74) *Attorney, Agent, or Firm* — Grossman, Tucker, Perreault & Pfleger, PLLC

(57) ABSTRACT

A thickness measurement system includes a composite carrier assembly and a thickness sensor system. The composite carrier assembly includes a sample carrier and a gauge standard carrier. The sample carrier and gauge standard carrier are configured to simultaneously support a sample and a gauge standard, respectively. The thickness sensor system is configured to generate a signal representative of a thickness of the sample and to be calibrated with the gauge standard while the sample and the gauge standard are simultaneously supported by the sample carrier and the gauge standard carrier, respectively.

21 Claims, 6 Drawing Sheets

COMPOSITE CARRIER AND AUTOMATED THICKNESS MEASUREMENT AND CALIBRATION SYSTEM AND METHOD

CROSS-REFERENCE TO RELATED APPLICATION

The present application claims the benefit of U.S. Provisional Patent Application Ser. No. 62/115,401 filed Feb. 12, 2015, which is fully incorporated herein by reference.

TECHNICAL FIELD

The present invention relates to thickness gauge systems and methods and more particularly, to automated thickness measurement and calibrating systems and methods.

BACKGROUND INFORMATION

Thickness sensor systems are used to verify the thickness of components, for example, during a manufacturing process. One example of a thickness sensor system includes two thickness sensors or probes (e.g., but not limited to, electronic touch probes or pneumatic). The thickness sensors or probes may be zeroed to establish the theoretical zero thickness relationship of the thickness sensors or probes. A gauge block having the desired National Institute of Standards and Technology (N.I.S.T) traceable accuracy (e.g., but not limited to, Grade AA Starrett-Webber 0.100" gauge block<+/−0.00003") may be used to master "zero" location of the two thickness sensors or probes.

In some applications that require very high thickness accuracy and precision, it is desirable to measure the thickness of a component at a plurality of different points across the surface of the component. The plurality of thickness measurements may be used to determine whether the component has a sufficiently uniform thickness for its intended purpose. Additionally, in applications that require very high thickness accuracy and precision, it is desirable to calibrate the thickness sensor system before and/or after each thickness measurement cycle. A measurement cycle comprises calibrating the sensor, placing the component on a surface between the two sensors, activating the sensors to close (obtain a measurement), transmit the measured value, then sensor will open to allow the component to be manually moved to the next position to be measured. Unfortunately, the known systems for measuring thickness require a user to manually move the component to each position to be measured. As may be appreciated, this is a time consuming process and results in fewer measurements being taken than are truly required to accurately certify the component as acceptable. This also increases the likelihood of damage to component being measured.

As such, what is needed is a thickness sensor system that reduces the amount of time necessary to achieve multiple high accuracy thickness measurements.

BRIEF DESCRIPTION OF THE DRAWINGS

These and other features and advantages will be better understood by reading the following detailed description, taken together with the drawings wherein.

DETAILED DESCRIPTION

A thickness measurement system, consistent with embodiments described herein, generally includes a composite carrier assembly and a thickness sensor system. The composite carrier assembly includes a sample carrier and a gauge standard carrier. The sample carrier and gauge standard carrier are configured to simultaneously support a sample and a gauge standard, respectively. The thickness sensor system is configured to generate a signal representative of a thickness of the sample and to be calibrated with the gauge standard while the sample and the gauge standard are simultaneously supported by the sample carrier and the gauge standard carrier, respectively. As such, multiple thickness measurements may be taken at a plurality of different locations across the sample without having to remove the sample or gauge standard. The thickness measurement system may therefore be automated, thereby further increasing the speed at which the plurality of measurement may be taken.

Figure 1:
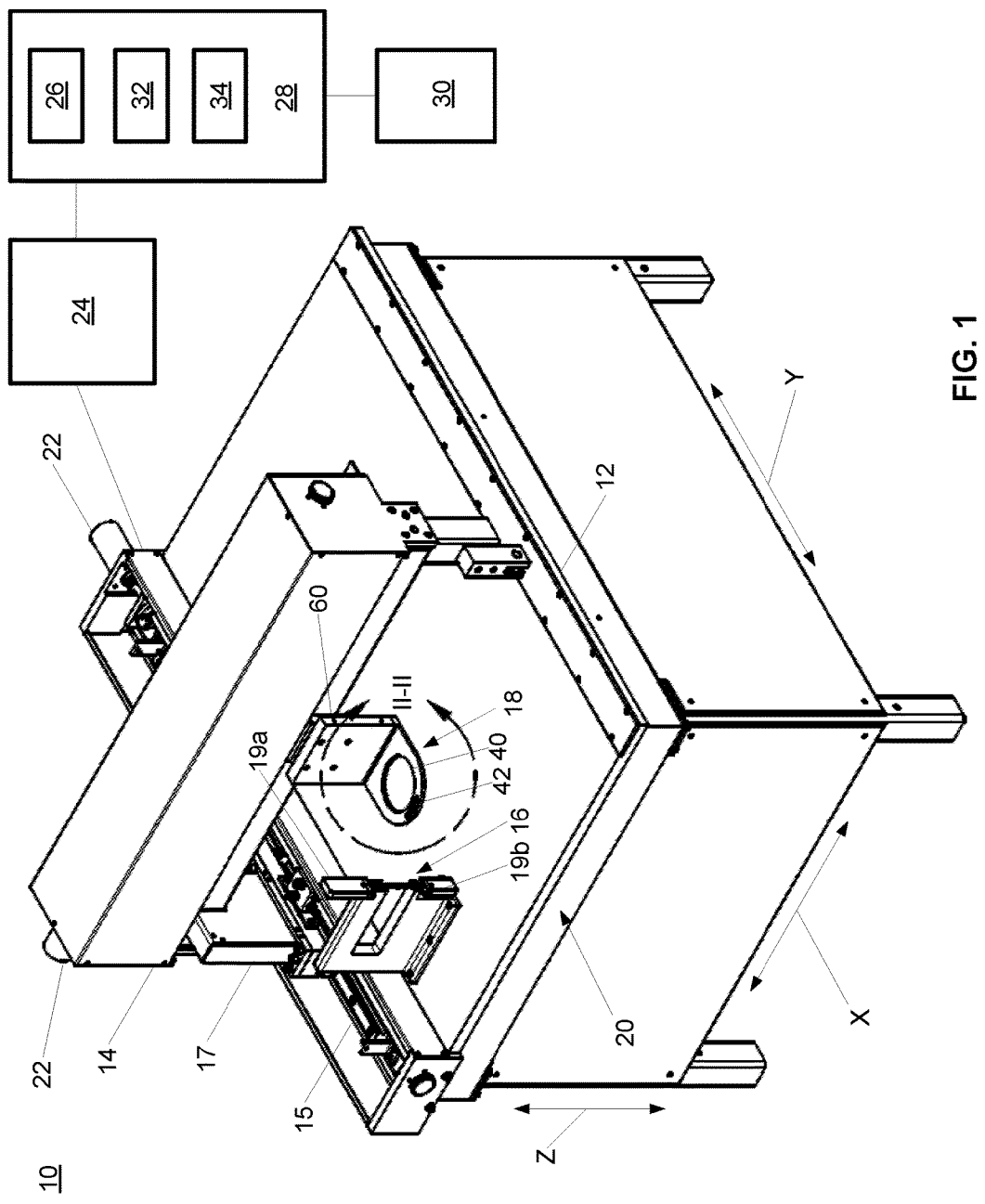
FIG. 1 is a schematic diagram of a thickness measuring system, consistent with an embodiment of the present disclosure, including a composite carrier assembly and a thickness sensor system.

Turning now to FIG. 1, one embodiment of a thickness measuring system 10 is generally illustrated. The thickness measuring system 10 may include a platform 12, at least one arm 14, at least one thickness sensor system 16, and at least one composite carrier assembly 18. As described herein, the thickness measuring system 10 is configured to quickly and accurately measure the thickness of a sample/component/part (hereinafter referred to as a sample for convenience). The thickness measuring system 10 may be configured to measure the thickness of a sample in a completely or almost completely automated manner.

At least a portion of the platform 12 and/or the arm 14 may be moveable in the x, y, and/or z directions to align the composite carrier assembly 18 and the thickness sensor system 16. In particular, the platform 12 and/or the arm 14 may be moveable in the x, y, and/or z directions to move the composite carrier assembly 18 and/or the thickness sensor system 16 into and out of position with respect to each other.

For example, in the illustrated embodiment the platform 12 is stationary and at least a portion of the arm 14 is moveable in the x, y, and/or z directions. However, it should be appreciated that the arm 14 may be stationary and that at least a portion of the platform 12 may be moveable in the x, y, and/or z directions. According to yet another embodiment, at least a portion of both the platform 12 and the arm 14 may be moveable in the x, y, and/or z directions. Movement of the platform 12 and/or arm 14 may be along one or more guide rails 15 (e.g., but not limited to, square guide rails) and may include one or more high resolution linear encoders 17. The high resolution encoders 17 may be configured to provide detailed positional information which may be used to determine the position of the composite carrier assembly 18 (e.g., positional information of the composite carrier assembly 18 into and out of position with respect to the thickness sensor system 16).

As used herein, the x and y axes are defined as two axes that are perpendicular to each other and extending in a single plane (e.g., but not limited to, the plane of the platform 12), while the z axis is defined as an axis extending generally perpendicular to the x and y axes. For ease of reference, the x axis may be referred to as an axis extending left and right with respect to the front 20 of the platform 12, the y axis may be referred to as an axis extending front and back with respect to the front 20 of the platform 12, and the z axis may be referred to as an axis extending up and down with respect to the platform 12.

While the arm 14 is illustrated as being disposed above the platform 12, it should be appreciated that the arm 14 may be disposed generally co-planar with the platform 12 and/or disposed generally below the platform 12. Additionally, while the thickness measuring system 10 is illustrated having a single platform 12 and a single arm 14, it should be appreciated that the thickness measuring system 10 may include a plurality of platforms 12 and/or a plurality of arms 14.

One or more actuators 22 may be configured to move at least a portion of the platform 12 and/or arm 14 in one or more of the x, y, and/or z axes. According to one embodiment, separate actuators 22 may be provided to move the platform 12 and/or arm 14 in each of x, y, and/or z axes. Alternatively (or in addition), the platform 12 and/or arm 14 may be moved in two or more axes (x, y, and/or z) by a single actuator 22.

The actuator(s) 22 may be controlled by a motor controller 24. The motor controller 24 may be configured to receive commands and/or instructions from a computer numerical control (CNC) module 26 of a computer 28. The motor controller 24 may also be configured to transmit information representative of the position of the composite carrier assembly 18 (e.g., from the linear encoder(s) 17) to the CNC module 26.

The CNC module 26 may use information received from the linear encoder(s) 17 to determine the position of the composite carrier assembly 18, for example, with respect to the thickness sensor system 16. A user may program the movement of the platform 12 and/or the arm 14 using the CNC module 26 to align the composite carrier assembly 18 into and out of position with respect to the thickness sensor system 16 to allow the thickness measuring system 10 to take one or more thickness measurements of a sample disposed within the composite carrier assembly 18, and also to calibrate the thickness sensor system 16 before and/or after measuring the thickness of the sample. According to one embodiment, the CNC module 26 may record/store commands generated and entered by the user to generate one or more programs. For example, the user may enter commands using an input/output device 30 such as, but not limited to, a keyboard, joystick, mouse, or the like). The commands may result in the movement of the platform 12 and/or 14 to desired locations and/or may result in various operations being performed by the thickness measuring system 10 such as, but not limited to, loading and/or unloading of the sample in the composite carrier assembly 18, causing the thickness sensor system 16 to generate and/or determine thickness measurements, and/or cause calibration of the thickness sensor system 16. Upon completion of the program, the CNC module 26 may save the program (e.g., in memory 32) for execution at a later time. The CNC module 26 may include any known and/or hereinafter developed CNC software and/or circuitry for controlling and/or setting the position of the arm 14 relative to the platform 12. For example, the computer 28 may include memory 32 for storing the CNC module 26 and at least one processor 34 for executing the CNC module 26 as is well known in the art.

In one example, the CNC module 26 is configured store a position program in the memory 32. The position program includes a plurality of commands and a plurality of predetermined positions. The CNC module 26 is further configured to cause at least one actuator 22 to move at least one of the platform support 12 and the arm 14 (e.g., the thickness sensor system 16 and the composite carrier 18) to the plurality of predetermined positions. The plurality of predetermined positions may include at least one calibration position in which the thickness sensor system 16 is aligned with a gauge standard GS supported in the gauge standard carrier 42 of the composite carrier 18 (see, for example FIG. 2) and a plurality of thickness positions in which the thickness measuring system 16 is aligned with a sample S supported in the sample carrier 40 of the composite carrier 18 (see, for example, FIG. 2) at a plurality of different locations about the sample S. The plurality of commands may include, for example, instructions to cause the thickness sensor system 16 to take a thickness measurement of a sample S supported by the composite carrier 18 and/or instructions to cause the thickness sensor system 16 to calibrate using the gauge standard GS supported by the composite carrier 18.

As noted herein, the thickness measuring system 10 may include one or more thickness sensor systems 16. For example, one or more thickness sensor systems 16 may be coupled to the platform 12 and/or the arm 14. One or more of the thickness sensor systems 16 may be moveable in one or more of the x, y, and/or z directions. Alternatively, one or more of the thickness sensor systems 16 may be stationary.

The thickness sensor systems 16 may include any thickness sensor systems for measuring the thickness of a sample. The thickness sensor systems 16 may include any known thickness measuring system for measuring the thickness of a sample/component/part S. For example, the thickness sensor systems 16 may include, but are not limited to, electronic touch probes, pneumatic touch probes, non-touch/non-contact probes, optical sensors (e.g., but not limited to, laser probes or the), ultrasonic thickness sensors, etc. The specific type, number, and arrangement of thickness sensor systems 16 to be used with the thickness measuring system 10 may be based on the sample/component/part being tested (e.g., size, shape, and material, hardness, scratch resistance, etc.), the desired resolution (accuracy), and/or customer requirements.

For example, a thickness sensor system 16 may include one or more probes 19a, 19b. According to one embodiment, two or more probes 19a, 19b may be disposed on generally opposite sides of the sample S to be measured. As may be appreciated, two or more probes 19a, 19b may measure may measure thickness in two planes, and may be configured to generate a thickness differential gap. Dual probes 19a, 19b may also measure more accurately than a single probe 19 and/or may allow the thickness sensor system 16 to measure contoured or recessed surfaces. In the illustrated embodiment, the thickness sensor system 16 includes a first (e.g., an upper) probe 19a to contact the first (e.g., upper) surface of the sample and a second (e.g., a lower) probe 19b to contact the second (e.g., lower) surface of the sample. It should be appreciated, however, that the thickness sensor system 16 may include one probe 19 or more than two probes 19a, 19b.

As noted herein, the known thickness measurement systems require a user/operator to place a gauge standard onto a stage. Then, the operator can calibrate the thickness sensor system. The operator then has to manually remove the gauge standard, and manually place the sample to be measured onto a stage. The operator can thereafter measure the thickness of the sample at one location. After the thickness measurement, the operator has to manually move the sample to the next measurement location. This process is repeated for each thickness measurement taken at each position.

As may be appreciated, this is a time consuming process. Unfortunately, some operators skip calibrating the thickness sensor system after the measurement cycle has been completed. Additionally, the repetitive manual moving of the sample requires the operator to handle the sample a lot, thereby increasing the possibility of the sample becoming damaged. Additionally, the known systems and method require the operator to manually select the various locations to be measured on the sample, and some operators will take a plurality of measurements at the same location on the sample or at locations that do not represent the overall thickness consistency of the sample. As a result, the overall accuracy of the known systems and methods is decreased since precise locations on the sample cannot be easily reproduced repeatedly for each and every sample.

The thickness measuring system 10 consistent with at least one embodiment of the present disclosure solves the above noted problems. In particular, as noted herein, the thickness measuring system 10 includes at least one composite carrier assembly 18. For example, one or more composite carrier assemblies 18 may be coupled to the platform 12 and/or the arm 14. One or more of the composite carrier assemblies 18 may be moveable in one or more of the x, y, and/or z directions. Alternatively, one or more of the composite carrier assemblies 18 may be stationary.

The composite carrier assembly 18 is configured to support at least one sample to be measured while also simultaneously being configured to support at least one gauge standard for calibrating the thickness sensor system 16. The composite carrier assembly 18 allows the thickness measuring system 10 to take a plurality of thickness measurements and calibrations without removing/handling the sample or the gauge standard. As such, the thickness measuring system 10 may quickly and easily measure the thickness of the sample in a plurality of locations while also calibrating the thickness sensor system 16 before and/or after taking measurements of the sample without having to remove either the sample or the gauge standard. In addition, the measuring and calibration process may be fully (or substantially fully) automated. As a result, the likelihood of damaging either the sample or the gauge standard is reduced. In addition, automating the thickness measurements and calibration greatly increases the speed at which the thickness measuring system 10 may measure samples/components/parts allowing for many more measurements to be taken, thus increasing the certainty that component thickness falls within the engineering limits.

Figure 2:
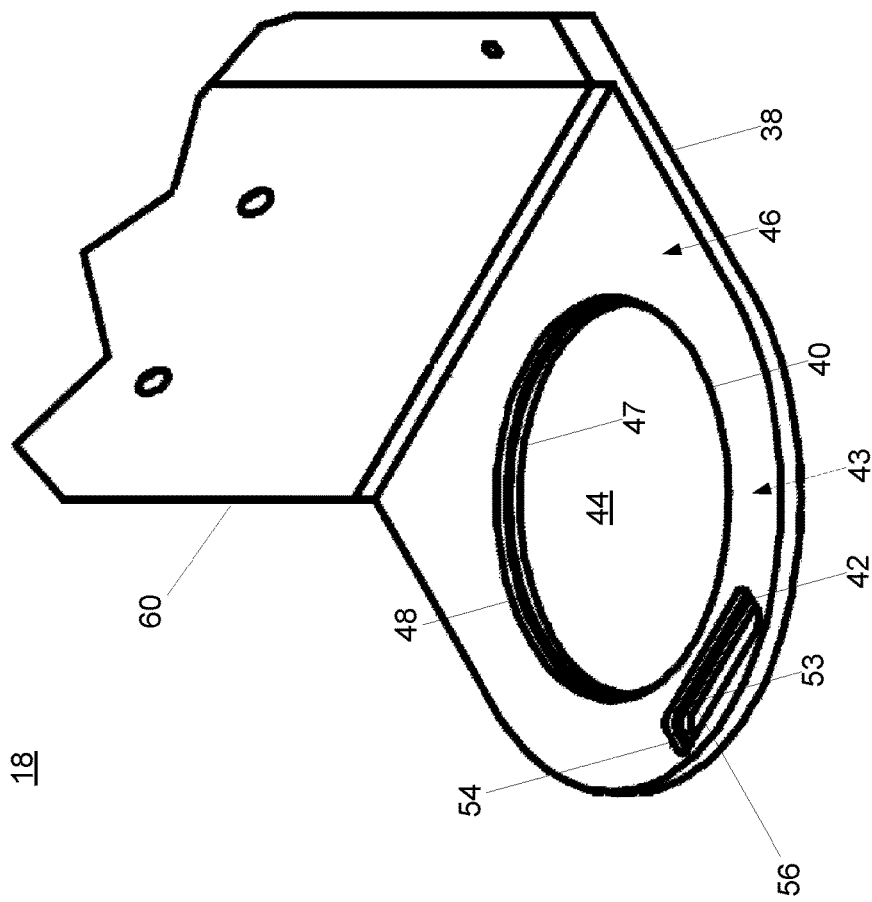
FIG. 2 is a schematic diagram of one embodiment of the composite carrier assembly from region II-II of FIG. 1, consistent with an embodiment of the present disclosure.
Figure 3:
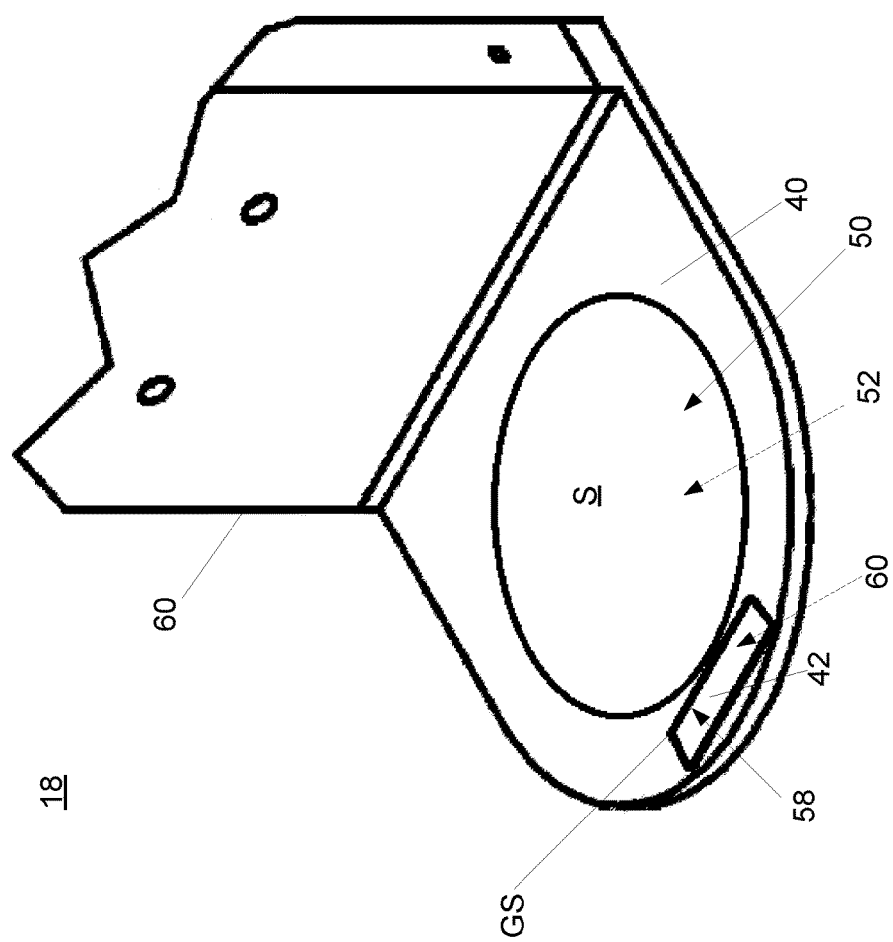
FIG. 3 is a schematic diagram of the composite carrier assembly from FIG. 2 together with a sample and a gauge standard, consistent with an embodiment of the present disclosure.
Figure 4:
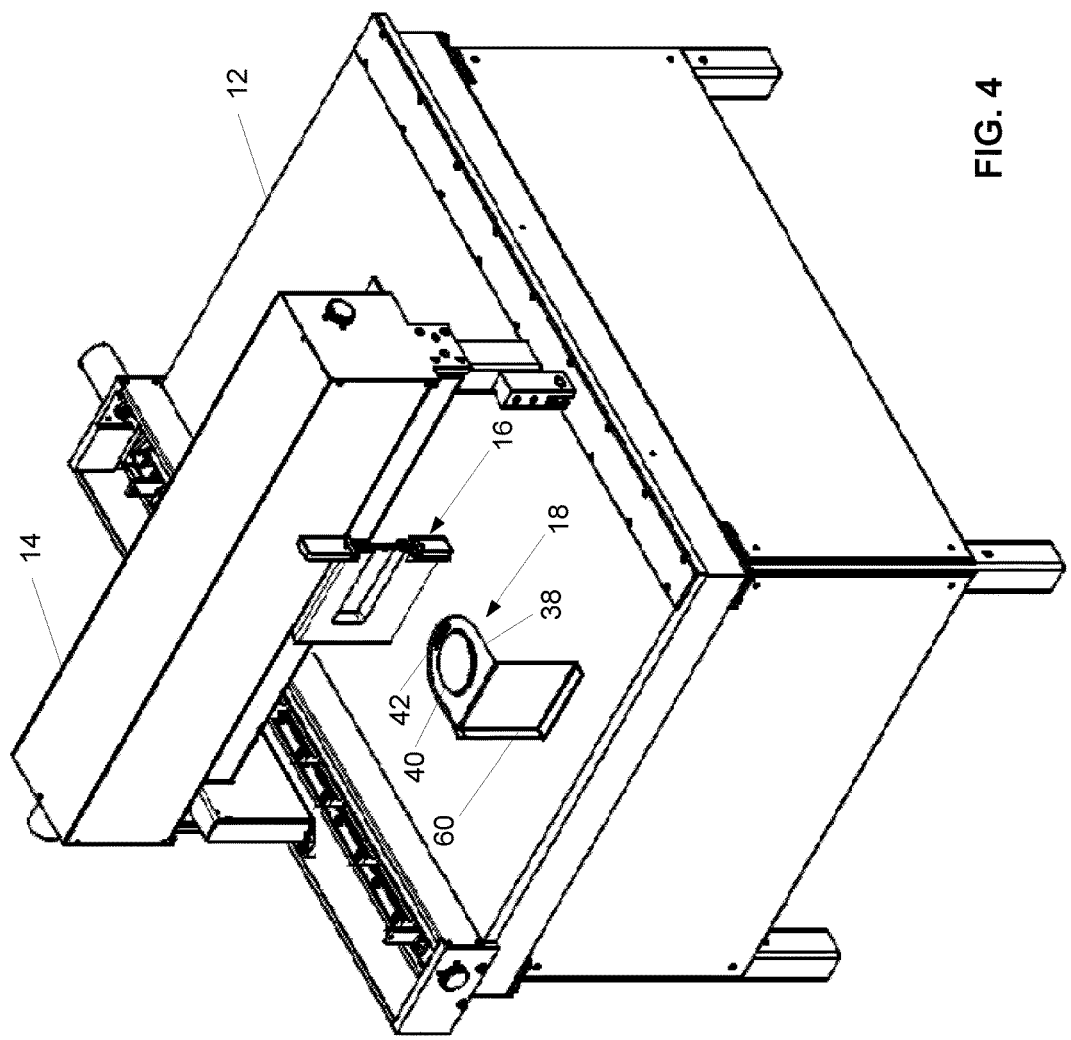
FIG. 4 illustrates another embodiment of a thickness measuring system, consistent with an embodiment of the present disclosure, including a composite carrier assembly and a thickness sensor system.
Figure 5:
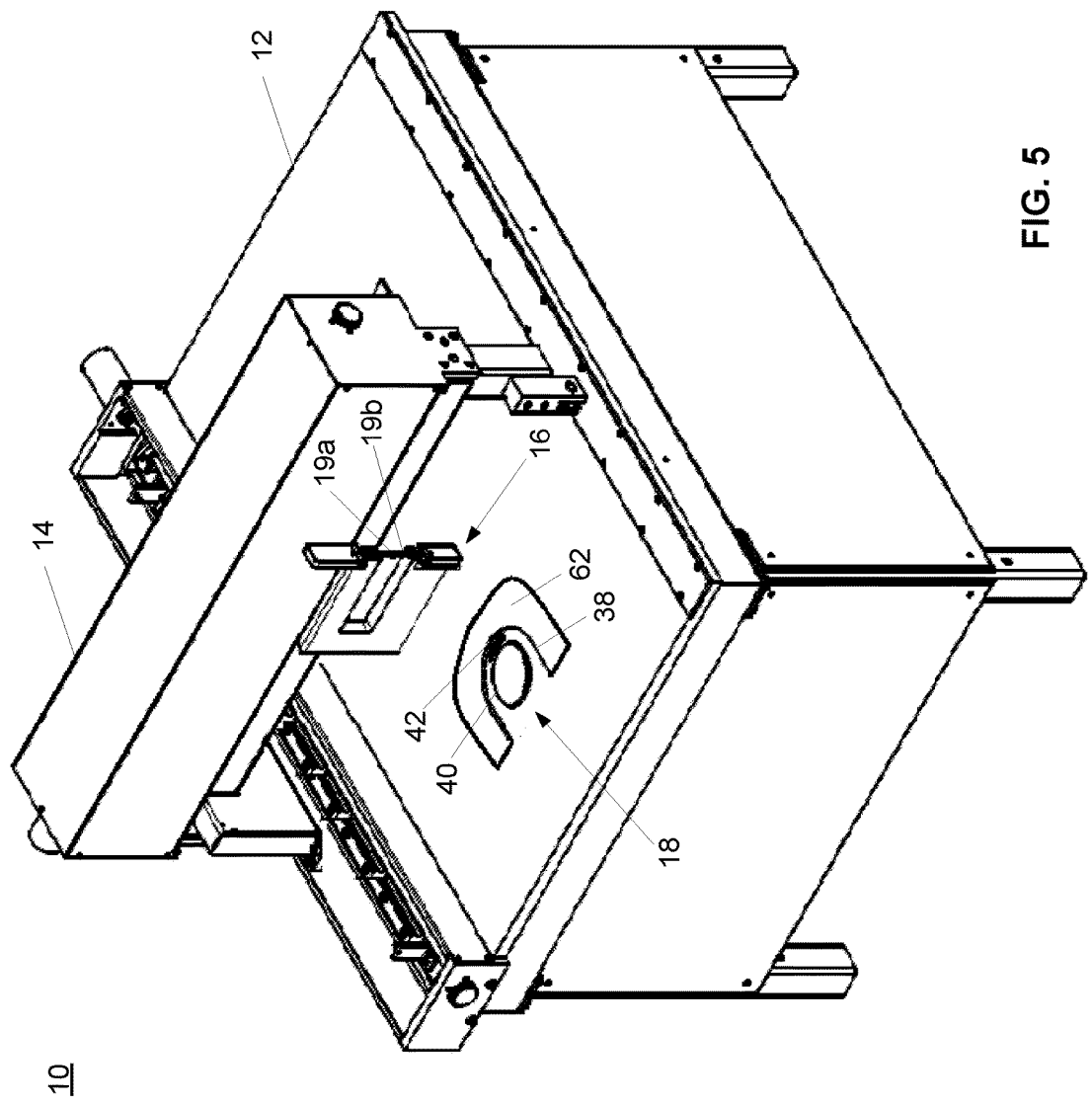
FIG. 5 illustrates yet another embodiment of a thickness measuring system, consistent with an embodiment of the present disclosure, including a composite carrier assembly and a thickness sensor system.

The composite carrier assembly 18 includes at least one sample carrier 40 and at least one gauge standard carrier 42. The sample carrier 40 is configured to removably receive and support at least one sample to be measured using the thickness sensor system 16 and the gauge standard carrier 42 is configured to support at least one gauge standard GS for calibrating the thickness sensor system 16. As noted herein, the composite carrier assembly 18 (e.g., the sample carrier 40 and gauge standard carrier 42) are configured to simultaneously support at least one sample and at least one gauge standard such that the thickness measuring system 10 (e.g., thickness sensor system 16) may measure the thickness of the sample and calibrate the thickness sensor system 16 before and/or after the thickness measurements. One or more composite carrier assemblies 18 may be configured to be secured, mounted, or otherwise coupled to a portion of the arm 14 as generally illustrated in FIGS. 1-3. Alternatively (or in addition), one or more composite carrier assemblies 18 may be configured to be secured, mounted, or otherwise coupled to a portion of the platform 12 as generally illustrated in FIGS. 4-5.

With reference to FIGS. 2 and 3, one embodiment of the composite carrier assembly 18 shown in region II-II of FIG. 1 is generally illustrated in more detail. In particular, FIG. 2 generally illustrates the composite carrier assembly 18 including a sample carrier 40 and gauge standard carrier 42 without the sample S and gauge standard GS, while FIG. 3 generally illustrates the composite carrier assembly 18 including a sample carrier 40 and gauge standard carrier 42 supporting a sample S and gauge standard GS, respectively.

In the illustrated embodiment, the composite carrier assembly 18 includes at least one base 38 defining at least one sample carrier 40 and at least one gauge standard carrier 42. The base 38 is configured to allow the sample carrier 40 and gauge standard carrier 42 to be aligned with respect to the thickness sensor system 16 such that the sample S disposed within the sample carrier 40 may be measured using the thickness sensor system 16 and the gauge standard GS disposed within the gauge standard carrier 42 may be used to calibrate the thickness sensor system 16 without having to remove either the sample or the gauge standard. According to at least one embodiment, the base 38 is configured such that the sample S and gauge standard GS supported by the sample carrier 40 and gauge standard carrier 42, respectively, are disposed in substantially the same plane.

The sample carrier 40 may be configured to support one or more samples S in any manner known to those skilled in the art, for example, as generally illustrated in FIG. 3. In the illustrated embodiment, the sample carrier 40 includes at least sample passageway 44 (FIG. 2) extending between an upper and a lower surface 43, 46 of the base 38. At least a portion of the sample carrier 40 (e.g., the sample passageway 44) includes a sidewall 47 defining a lip, notch, groove, shoulder, recess or the like 48 (FIG. 2) configured to receive and support the sample S as generally illustrated in FIG. 3. The exact dimensions of the sample carrier 40 (e.g., the lip 48) with therefore depend on the size and shape of the sample S, as well as the number of samples S to be held therein.

According to one embodiment, at least a portion of the sample carrier 40 (e.g., the sidewall 47) may have a perimeter substantially corresponding to at least a portion of a perimeter of the sample S. For example, the entire perimeter of the sidewall 47 may substantially correspond to the entire perimeter of the sample S. At least a portion of the lip 48 may extend generally outward from the sidewall 47 and into the sample passageway 44. The lip 48 may have at least one cross-sectional dimension that is smaller than a corresponding cross-sectional dimension of the sample S such that the sample S may be supported by the lip 48 at least partially within the sample passageway 44. For example, the sample S may be loaded into the sample carrier 40 and removably supported by the lip 48.

While not shown, the sample carrier 40 may optionally include one or more clamps, brackets, mounts, or the like to further secure the sample S to the composite carrier assembly 18. In addition, the sample carrier 40 may be configured to support a plurality of samples S, which may have the same and/or different sizes and/or shapes. The sample carrier 40 may therefore be configured to removably support one or more samples S and allow the upper probe 19a of the thickness sensor system 16 to contact the first (e.g., upper) surface 50 of the sample S (FIG. 3) and the second (e.g., a lower) probe 19b of to contact the second (e.g., lower) surface 52 (illustrated by the dotted lines in FIG. 3) of the sample S.

While the sample S is shown being received in and supported by the lip 48 of the sample carrier 40 in FIG. 3, it should be appreciated that this is only one embodiment and the sample carrier 40 may support the sample S in any manner known to those skilled in the art. For example, the sample S may be secured to one of the surfaces 43, 46 of the base 38 using a clamp, bracket, fastener, mount, or the like. Additionally, it should be appreciated that the sample passageway 44 may be configured to allow at least a portion of one of the probes 19a, 19b to be at least partially advanced within the sample passageway 44 to measure the thickness of the sample S.

The gauge standard carrier 42 is configured to support one or more gauge standards GS in any manner known to those skilled in the art, for example, as generally illustrated in FIG. 3. As may be appreciated, the specific tolerance of the gauge standard GS may be selected based on the desired accuracy and precision of the thickness sensor system 16. By way of example, the gauge standard GS may have accuracies based on various grading standards such as, but not limited to, JIS B 7506-1997 (Japan)/DIN 861-1980 (Germany), ASME (US), BS 4311: Part 1: 1993 (UK). Tolerances will vary within the same grade as the thickness of the material increases. For example, reference (AAA) is generally described as having a small tolerance (±0.05 μm) that may be used to establish standards; calibration (AA) is generally described as having a tolerance of +0.10 μm to −0.05 μm and may be used to calibrate inspection blocks and very high precision gauging; inspection (A) is generally described as having a tolerance of +0.15 μm to −0.05 μm and may be used as toolroom standards for setting other gauging tools; and workshop (B) is generally described as having a large tolerance (tolerance +0.25 μm to −0.15 μm) that may be used as shop standards for precision measurement. Of course, other grade designations exist including, but not limited to, the U.S. Federal Specification GGG-G-15C (0.5—generally equivalent to grade AAA; 1—generally equivalent to grade AA; 2—generally equivalent to grade A+; and 3—compromise grade between A and B) as well as ANSI/ASME B89.1.9M (which defines both absolute deviations from nominal dimensions and parallelism limits as criteria for grade determination).

In the illustrated embodiment, the gauge standard carrier 42 includes at least gauge standard passageway 53 (FIG. 2) extending between the upper and a lower surface 43, 46 of the base 38. At least a portion of the gauge standard carrier 42 (e.g., the gauge standard passageway 52) includes a sidewall 54 defining a lip, notch, groove, shoulder, recess or the like 56 (FIG. 2) configured to receive and support the gauge standard GS as generally illustrated in FIG. 3. The exact dimensions of the gauge standard carrier 42 (e.g., the lip 56) with therefore depend on the size and shape of the gauge standard GS, as well as the number of gauge standards GS to be held therein.

According to one embodiment, at least a portion of the gauge standard carrier 42 (e.g., the sidewall 54) may have a perimeter substantially corresponding to at least a portion of a perimeter of the gauge standard GS. For example, the entire perimeter of the sidewall 54 may substantially correspond to the entire perimeter of the gauge standard GS. At least a portion of the lip 56 may extend generally outward from the sidewall 54 and into the gauge standard passageway 52. The lip 56 may have at least one cross-sectional dimension that is smaller than a corresponding cross-sectional dimension of the gauge standard GS such that the gauge standard GS may be supported by the lip 56 at least partially within the gauge standard passageway 52. For example, the gauge standard GS may be loaded into the gauge standard carrier 42 and removably supported by the lip 56.

The gauge standard carrier 42 may optionally include one or more clamps, brackets, mounts, or the like to further secure the gauge standard GS to the composite carrier assembly 18. In addition, the gauge standard carrier 42 may be configured to support a plurality of gauge standards GS, which may have the same and/or different sizes, shapes, and/or accuracies. The gauge standard carrier 42 may therefore be configured to removably support one or more gauge standard GS and allow the upper probe 19a of the thickness sensor system 16 to contact the first (e.g., upper) surface 58 of the gauge standard GS and the second (e.g., a lower) probe 19b of to contact the second (e.g., lower) surface 60 (illustrated by the dotted lines) of the gauge standard GS.

While the gauge standard GS is shown being received in and supported by the lip 56 of the gauge standard carrier 42 in FIG. 3, it should be appreciated that this is only one embodiment and the gauge standard carrier 42 may support the gauge standard GS in any manner known to those skilled in the art. For example, the gauge standard GS may be secured to one of the surfaces 43, 46 of the base 38 using a clamp, bracket, fastener, mount, or the like. Alternatively (or in addition), the gauge standard GS may be integrally formed into the gauge standard carrier 42. Additionally, it should be appreciated that the gauge standard passageway 53 may be configured to allow at least a portion of one of the probes 19a, 19b to be at least partially advanced within the gauge standard passageway 53 to measure the thickness of the gauge standard GS.

Turning now to FIGS. 1-4, the composite carrier assembly 18 optionally includes a support brace 60 that may extend from the base 38 of the composite carrier assembly 18. According to one embodiment, the support brace 60 may be configured to be secured, mounted, or otherwise coupled to a portion of the arm 14 as generally illustrated in FIGS. 1-3. For example, the support brace 60 may be removably coupled to the arm 14 or integrally (e.g., unitary/one-piece) formed with the arm 14. The support brace 60 may also (or alternatively) be removably coupled to the base 38 or integrally (e.g., unitary/one-piece) formed with the base 38. A shown in FIG. 1, the support brace 60 may be coupled to the arm 14 and the base 38 such that the base 38 (e.g., the sample carrier 40 and gauge standard carrier 42) is arranged substantially horizontally (e.g., substantially in a plane parallel to x and y axes). It should be appreciated, however, that the support brace 60 may be coupled to the arm 14 and the base 38 such that the base 38 is arranged in any other orientation including, but not limited to, substantially vertically (e.g., substantially in a plane perpendicular to the x and y axes).

According to another embodiment, the support brace 60 may extend from the base 38 and may be configured to be secured, mounted, or otherwise coupled to a portion of the platform 12 as generally illustrated in FIG. 4. For example, the support brace 60 may be removably coupled to the platform 12 or integrally (e.g., unitary/one-piece) formed with the platform 12. The support brace 60 may also (or alternatively) be removably coupled to the base 38 or integrally (e.g., unitary/one-piece) formed with the base 38. A shown in FIG. 4, the support brace 60 may be coupled to the platform 12 and the base 38 such that the base 38 (e.g., the sample carrier 40 and gauge standard carrier 42) is arranged substantially horizontally (e.g., substantially in a plane parallel to x and y axes). It should be appreciated, however, that the support brace 60 may be coupled to the platform 12 and the base 38 such that the base 38 is arranged in any other orientation including, but not limited to, substantially vertically (e.g., substantially in a plane perpendicular to the x axis and y axis).

While the support brace 60 is illustrated in a fixed position relative to the either the arm 14 or platform 12 to which is it secured, the support brace 60 may be adjusted. For example, the length of the support brace 60 may be adjusted to allow the base 38 of the composite carrier assembly 18 to move in any one or more of the x, y, and/or z axes. This may be particularly useful when multiple bases 38 are coupled to the support brace 60 at different positions. For example, multiple bases 38 (each having one or more sample carriers 40 and gauge standard carriers 42) may be secured to the support brace 60 at different vertical positions. The adjustable support 60 may allow the different bases 38 (and corresponding sample carriers 40 and gauge standard carriers 42) to be aligned with respect to the thickness sensor system 16.

Turning now to FIG. 5, one embodiment of the composite carrier assembly 18 is shown wherein the base 38 of the composite carrier assembly 18 is coupled to or integral with (i.e., one piece) with the platform 12. The platform 12 also includes a recess 62 extending at least partially around the base 38 of the composite carrier assembly 18. The recess 62 is configured to receive at least a portion of one of the probes 19a, 19b of the thickness sensor system 16 such that the probes 19a, 19b may be aligned with the top and bottom surfaces 50, 52 of the sample S and the top and bottom surfaces 58, 60 of the gauges standard GS.

Figure 6:
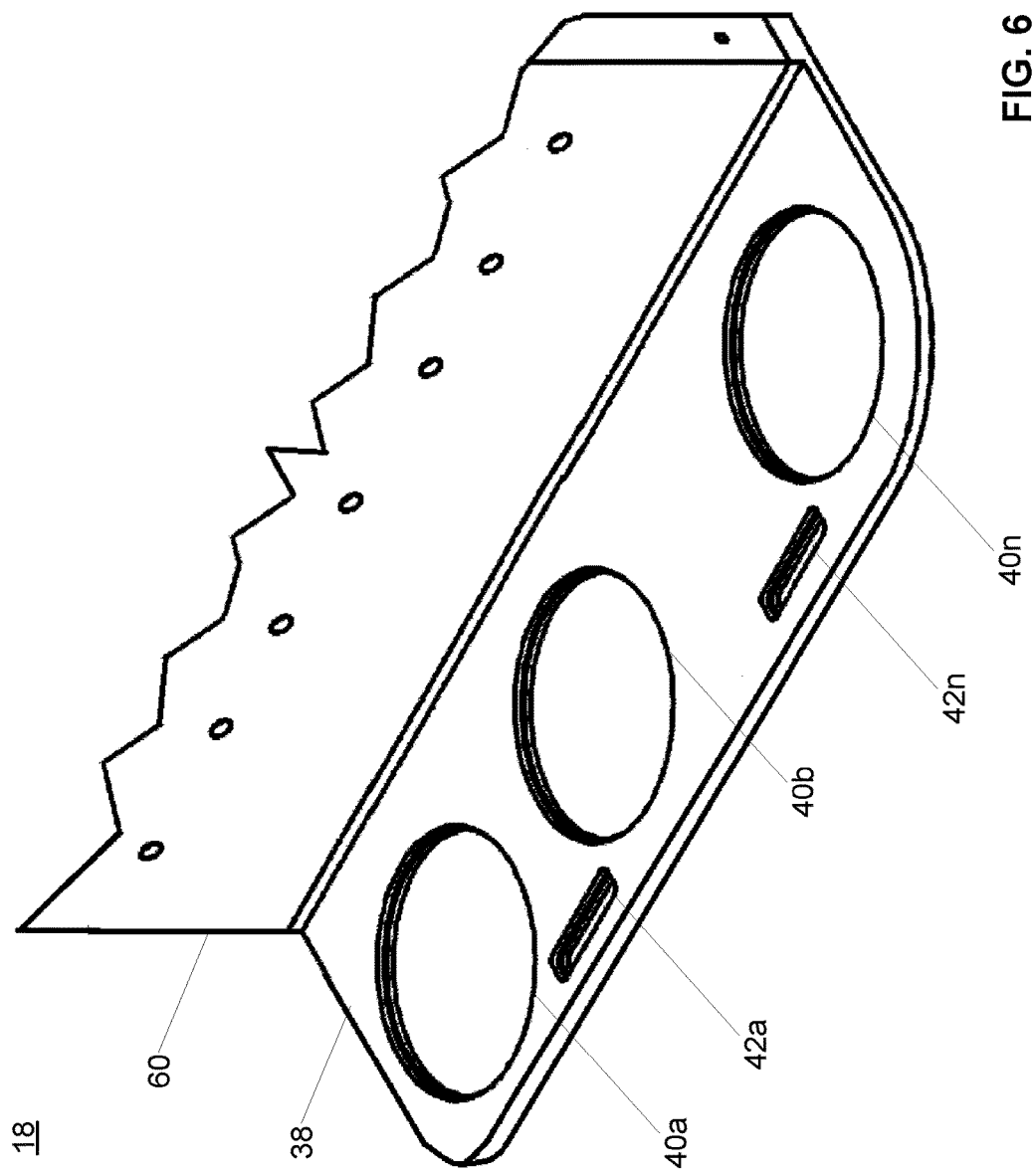
FIG. 6 illustrates another embodiment of a composite carrier assembly including a plurality of sample carriers and a plurality of gauge standard carriers, consistent with an embodiment of the present disclosure.

Turning now to FIG. 6, one embodiment of a composite carrier assembly 18 having a plurality of sample carriers 40a-40n and a plurality of gauge standard carrier 42a-42n is generally illustrated. As may be appreciated, the composite carrier 18 may include a single gauge standard carrier 42 if the desired accuracy for the plurality of samples S to be supported by the sample carriers 40a-40n is the same.

As may therefore be appreciated, the composite carrier assembly 18 allows one or more samples S to be loaded (e.g., supported) simultaneously with one or more gauge standards GS. Once the samples S and gauge standard GS are supported by the composite carrier assembly 18, the thickness measuring system 16 may measure the thickness of the samples S in one or more (e.g., a plurality) of locations while also calibrating the thickness measuring system 16 before and/or after each thickness measurement. Because the samples S are present and adjacent to the gauge standards GS by the composite carrier assembly 18, the thickness measurements and calibrations may be automated. As a result, the amount of time required to generate a plurality of thickness measurements and calibrations may be significantly reduced compared to known thickness measurement systems. Moreover, because the thickness measurements and calibrations with the thickness measuring system 10 consistent with the present disclosure may be automated, the accuracy and precision of the measurements may be ensured and/or enhanced by guaranteeing that each measurement is taken at specific locations on the sample S and guaranteeing that the thickness measuring system 16 is properly calibrated before and/or after each thickness measurement cycle. Moreover, a plurality of thickness measurements may be taken of each sample S without the need to remove the sample from the thickness measuring system 10. As such, the possibility of damaging the sample S and/or the gauge standard GS is reduced. It may also be appreciated that since the thickness measurements and calibrations may be automated, the loading and unloading of samples S into the composite carrier assembly 18 may also be automated.

According to one aspect, the present disclosure features a thickness measurement system. The thickness measurement system includes a composite carrier assembly and a thickness sensor system. The composite carrier assembly includes a sample carrier and a gauge standard carrier. The sample carrier and gauge standard carrier are configured to simultaneously support a sample and a gauge standard, respectively. The thickness sensor system is configured to generate a signal representative of a thickness of the sample and to be calibrated with the gauge standard while the sample and the gauge standard are simultaneously supported by the sample carrier and the gauge standard carrier, respectively. According to one embodiment, the sample carrier and the gauge standard carrier may be configured to simultaneously support at least a portion of the sample and the gauge standard, respectively, in substantially the same plane.

The thickness measurement may optionally include a platform support and an arm coupled thereto. The arm may be moveable relative the platform support. For example, the thickness sensor system may be coupled to the platform support and the composite carrier assembly may be coupled to the arm. Alternatively (or in addition), the composite carrier assembly may be coupled to the platform support and the thickness sensor system may be coupled to the arm.

The composite carrier assembly may include a base defining the sample carrier and the gauge standard carrier, and wherein the sample carrier comprises a sample passageway extending between an upper and lower surface of the base. The sample passageway may further comprise a sidewall, wherein at least a portion of the sidewall has a perimeter substantially corresponding to at least a portion of a perimeter of the sample. Optionally, at least a portion of the sidewall defines a lip configured to receive and support the sample. At least a portion of the lip may extend generally outward from the sidewall and into the sample passageway. The lip may have at least one cross-sectional dimension that is smaller than a corresponding cross-sectional dimension of the sample.

At least one actuator may be configured to move the arm and the platform support relative to each other. The thickness measurement system may also include a computer numerical control (CNC) module configured to store a position program in memory. The position program may include a plurality of commands and a plurality of predetermined positions. The CNC module may be further configured to cause the at least one actuator to move at least one of the arm and the platform to the plurality of predetermined positions. The plurality of predetermined positions may be include at least one calibration position in which the thickness sensor system is aligned with the gauge standard supported in the gauge standard carrier and a plurality of thickness positions in which the thickness sensor system is aligned with the sample supported in the sample carrier at a plurality of different locations about the sample. The plurality of commands may comprise instructions to cause the thickness sensor system to take a thickness measurement of the sample and instructions to cause the thickness sensor system to calibrate using the gauge standard.

The composite carrier assembly may include a plurality of sample carriers, and optionally may include a plurality of gauge standard carriers. The gauge standard may be removably supported by the gauge standard carrier. Alternatively (or in addition), the gauge standard may be integral with the gauge standard carrier. The thickness sensor system may include a first and a second thickness probe. The first and second probe may be selected from the group consisting of electronic touch probes or pneumatic touch probes.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A thickness measurement system comprising:
    a composite carrier assembly including a sample carrier and a gauge standard carrier, said sample carrier and said gauge standard carrier configured to simultaneously support a sample and a gauge standard, respectively; and
    a thickness sensor system configured to generate a signal representative of a thickness of said sample and to be calibrated with said gauge standard while said sample and said gauge standard are simultaneously supported by said sample carrier and said gauge standard carrier, respectively.

2. The thickness measurement system of claim 1 further comprising a platform support and an arm coupled thereto.

3. The thickness measurement system of claim 2, wherein said arm is moveable relative said platform support.

4. The thickness measurement system of claim 3, wherein said thickness sensor system is coupled to said platform support, and wherein said composite carrier assembly is coupled to said arm.

5. The thickness measurement system of claim 3, wherein said composite carrier assembly is coupled to said platform support, and wherein said thickness sensor system is coupled to said arm.

6. The thickness measurement system of claim 2, further comprising at least one actuator configured to move said arm and said platform support relative to each other.

7. The thickness measurement system of claim 6, further comprising a computer numerical control (CNC) module configured store a position program in memory, said position program including a plurality of commands and a plurality of predetermined positions, wherein said CNC module is further configured to cause said at least one actuator to move at least one of said arm and said platform to said plurality of predetermined positions.

8. The thickness measurement system of claim 7, wherein said plurality of predetermined positions includes at least one calibration position in which said thickness sensor system is aligned with said gauge standard supported in said gauge standard carrier and a plurality of thickness positions in which said thickness sensor system is aligned with said sample supported in said sample carrier at a plurality of different locations about said sample.

9. The thickness measurement system of claim 7, wherein said plurality of commands comprises instructions to cause said thickness sensor system to take a thickness measurement of said sample and instructions to cause said thickness sensor system to calibrate using said gauge standard.

10. The thickness measurement system of claim 1, wherein said thickness sensor system includes a first and a second thickness probe.

11. The thickness measurement system of claim 1, wherein said sample carrier and said gauge standard carrier are configured to simultaneously support at least a portion of said sample and said gauge standard, respectively, in substantially the same plane.

12. The thickness measurement system of claim 1, wherein said composite carrier assembly includes a base defining said sample carrier and said gauge standard carrier, and wherein said sample carrier comprises a sample passageway extending between an upper and lower surface of said base.

13. The thickness measurement system of claim 12, wherein said sample passageway further comprises a sidewall, wherein at least a portion of said sidewall has a perimeter substantially corresponding to at least a portion of a perimeter of said sample.

14. The thickness measurement system of claim 13, wherein at least a portion of said sidewall defines a lip configured to receive and support said sample.

15. The thickness measurement system of claim 14, wherein at least a portion of the lip extends generally outward from the sidewall and into the sample passageway.

16. The thickness measurement system of claim 15, wherein said lip has at least one cross-sectional dimension that is smaller than a corresponding cross-sectional dimension of said sample.

17. The thickness measurement system of claim 1, wherein said gauge standard is removably supported by said gauge standard carrier.

18. The thickness measurement system of claim 1, wherein said gauge standard is integral with said gauge standard carrier.

19. The thickness measurement system of claim 1, wherein said composite carrier assembly includes a plurality of sample carriers.

20. The thickness measurement system of claim 19, wherein said composite carrier assembly includes a plurality of gauge standard carriers.

21. The thickness measurement system of claim 1, wherein said thickness sensor system comprises a first and a second probe selected from the group consisting of electronic touch probes or pneumatic touch probes.

* * * * *